United States Patent
Jiménez

(10) Patent No.: US 11,399,007 B2
(45) Date of Patent: Jul. 26, 2022

(54) METHODS AND APPARATUS FOR OPERATING AND MANAGING A CONSTRAINED DEVICE WITHIN A NETWORK

(71) Applicant: Telefonaktiebolaget LM Ericsson (publ), Stockholm (SE)

(72) Inventor: Jaime Jiménez, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 16/975,515

(22) PCT Filed: Mar. 20, 2018

(86) PCT No.: PCT/SE2018/050276
§ 371 (c)(1),
(2) Date: Aug. 25, 2020

(87) PCT Pub. No.: WO2019/182487
PCT Pub. Date: Sep. 26, 2019

(65) Prior Publication Data
US 2021/0036985 A1 Feb. 4, 2021

(51) Int. Cl.
*G06F 15/16* (2006.01)
*G06F 9/54* (2006.01)
(Continued)

(52) U.S. Cl.
CPC ........ *H04L 61/2517* (2013.01); *G06F 9/4401* (2013.01); *H04L 43/08* (2013.01); *H04L 61/256* (2013.01); *H04L 61/2553* (2013.01)

(58) Field of Classification Search
CPC .............. H04L 61/2517; H04L 61/256; H04L 61/2553; H04L 43/08; G06F 9/4401
(Continued)

(56) References Cited

U.S. PATENT DOCUMENTS 9,554,305 B2 * 1/2017 Moustafa .......... H04W 36/0016
10,298,694 B1 * 5/2019 Tagore .................. H04L 67/145
(Continued)

FOREIGN PATENT DOCUMENTS

CN          103535015 A       1/2014
WO      WO-0211459 A1 *   2/2002    .......... H04Q 3/0054
(Continued)

OTHER PUBLICATIONS

Making Constrained Things Reachable: A Secure IP-Agnostic NAT Traversal Approach for IoT ACM Transactions on Internet Technologyvol. 19Issue 1Feb. 2019 Article No. 3pp. 1-21https://doi.org/10.1145/3230640 (Year: 2018).*
(Continued)

*Primary Examiner* — Hamza N Algibhah
(74) *Attorney, Agent, or Firm* — Coats + Bennett, PLLC

(57) ABSTRACT

A method (200) is disclosed for operating a constrained device within a network, the network comprising a Network Address Translation (NAT) node deployed between the constrained device and a manager. The method comprises receiving from the manager configuration information for a Port Control Protocol (PCP) configuration data Object on the constrained device (210), the configuration information comprising a value for a Resource in the PCP configuration data Object (210a) and execution of a Resource in the PCP configuration data Object, the execution triggering sending of a PCP request (210b). The method further comprises sending a PCP Request to the NAT node in accordance with the executed Resource, the PCP Request including the Resource value received in the configuration information (220). Also disclosed are methods (500, 600) and apparatus for configuring and managing a constrained device.

20 Claims, 12 Drawing Sheets

400

| Resource ID | Name | Type | Default Value | |
|---|---|---|---|---|
| 0 | PCP Version | Integer | Default value is 2. | ⟵ 404 |
| 1 | Lifetime | Integer | Value set by LWM2M Server (>160 sec). | ⟵ 406 |
| 2 | IP Address | Long | Preferably global IPv6 address. | ⟵ 408 |
| 3 | PCP Status | Boolean | If PCP has been successfully enabled then status should be 1. | ⟵ 410 |
| 4 | Execute PCP Request | - | Used to trigger the request from the LWM2M server. | ⟵ 412 |

↑
402

(51) Int. Cl.
*H04L 29/06* (2006.01)
*H04L 61/2517* (2022.01)
*G06F 9/4401* (2018.01)
*H04L 43/08* (2022.01)
*H04L 61/2553* (2022.01)
*H04L 61/256* (2022.01)

(58) Field of Classification Search
USPC .......................................................... 709/245
See application file for complete search history.

(56) References Cited

U.S. PATENT DOCUMENTS

| | | | | |
|---|---|---|---|---|
| 2003/0177281 | A1* | 9/2003 | McQuillan | H04Q 3/0045 719/320 |
| 2014/0089386 | A1* | 3/2014 | Bondrescu | H04L 61/2582 709/203 |
| 2015/0079939 | A1* | 3/2015 | Naka | H04W 8/22 455/411 |
| 2015/0113588 | A1* | 4/2015 | Wing | H04L 63/0227 726/1 |
| 2015/0222595 | A1* | 8/2015 | Reddy | H04L 61/2517 709/226 |
| 2016/0043844 | A1* | 2/2016 | Meylan | H04L 5/0048 370/315 |
| 2016/0165663 | A1* | 6/2016 | Shanmugam | H04W 76/10 370/338 |
| 2017/0295503 | A1* | 10/2017 | Govindaraju | H04W 4/38 |
| 2020/0112540 | A1* | 4/2020 | Venkataraman | H04L 63/00 |
| 2021/0367926 | A1* | 11/2021 | Jimenez | H04L 63/0263 |

FOREIGN PATENT DOCUMENTS

| | | | | |
|---|---|---|---|---|
| WO | WO-2013061116 | A1 * | 5/2013 | ....... H04L 29/06353 |
| WO | WO-2014046437 | A2 * | 3/2014 | ........... H04L 67/141 |
| WO | 2017095283 | A1 | 6/2017 | |
| WO | WO-2017159645 | A1 * | 9/2017 | ......... H04L 61/2514 |
| WO | WO-2017206575 | A1 * | 12/2017 | .............. H04L 29/12 |
| WO | WO-2017220894 | A1 * | 12/2017 | ......... H04L 61/2582 |
| WO | WO-2018106159 | A1 * | 6/2018 | ......... H04L 61/2069 |
| WO | WO-2019182487 | A1 * | 9/2019 | ......... H04L 61/2553 |

OTHER PUBLICATIONS

Kiesel, S. et al., "Port Control Protocol (PCP) Anycast Addresses", Internet Engineering Task Force (IETF), Jan. 1, 2016, pp. 1-9, RFC 7723, IETF.

Bormann, C. et al., "Terminology for Constrained-Node Networks", Internet Engineering Task Force (IETF), May 1, 2014, pp. 1-17, RFC 7228, IETF.

Open Mobile Alliance, "Lightweight Machine to Machine Technical Specification", Version 1.0.1, Jul. 4, 2017, pp. 1-141, OMA-TS-LightweightM2M-V1_0_1-20170704-A, OMA.

Wing, D. et al., "Port Control Protocol (PCP)", Internet Engineering Task Force (IETF), Apr. 1, 2013, pp. 1-88, RFC 6887, IETF.

Edeline, K. et al., "Using UDP for Internet Transport Evolution", ETH TIK Technical Report 366, Dec. 22, 2016, pp. 1-12, arXiv:1612.07816v1, arXiv.

Bormann, C. et al., "CoAP (Constrained Application Protocol) Over TCP, TLS, and WebSockets", CORE Internet—Draft, May 16, 2017, pp. 1-47, draft-ietf-core-coap-tcp-tls-09.

Shelby, Z. et al., "The Constrained Application Protocol (CoAP)", Internet Engineering Task Force (IETF), Jun. 1, 2014, pp. 1-112, RFC 7252, IETF.

Chen, G., "(U)SIM based PCP Authentication", Network Working Group Internet-Draft, Jul. 3, 2014, pp. 1-8, draft-chen-pcp-authentication-sim-00, NWG.

Postel, J., "User Datagram Protocol", 1980-08-28, pp. 1-3, RFC 768, ISI.

* cited by examiner

| Resource ID | Name | Type | Default Value |
|---|---|---|---|
| 0 | PCP Version | Integer | Default value is 2. |
| 1 | Lifetime | Integer | Value set by LWM2M Server (>160 sec). |
| 2 | IP Address | Long | Preferably global IPv6 address. |
| 3 | PCP Status | Boolean | If PCP has been successfully enabled then status should be 1. |
| 4 | Execute PCP Request | - | Used to trigger the request from the LWM2M server. |

Figure 4

METHODS AND APPARATUS FOR OPERATING AND MANAGING A CONSTRAINED DEVICE WITHIN A NETWORK

TECHNICAL FIELD

The present disclosure relates to a method for operating a constrained device within a network, to a method for managing a constrained device within a network and to a method for configuring a constrained device within a network. The present disclosure also relates to a constrained device, to a manager for a constrained device, to a bootstrapping server for a constrained device and to a computer program and a computer program product configured, when run on a computer to carry out methods performed in a constrained device, a manager for a constrained device and a bootstrapping server for a constrained device.

BACKGROUND

The "Internet of Things" (IoT) refers to devices enabled for communication network connectivity, so that these devices may be remotely managed, and data collected or required by the devices may be exchanged between individual devices and between devices and application servers. Such devices are often subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as Internet Protocol (IP) v4 or IPv6, and dedicated protocols for constrained devices, including the Constrained Application Protocol (CoAP), as defined in Internet Engineering Task Force (IETF) RFC7252. CoAP is a generic RESTful application protocol for constrained devices and is designed to be used over the User Datagram Protocol (UDP, defined in IETF RFC0768) over the Internet.

Management of constrained devices may be performed using any suitable management protocol, including for example the Lightweight Machine to Machine (LWM2M) protocol, defined by the Open Mobile Alliance.

In IoT deployments, constrained devices frequently require one or more gateways to enable them to connect to other networks, including local networks and wider networks which may be accessed via the Internet. Many such gateways employ Network Address Translation (NAT) between a local network of the IoT deployment and a wider network such as the Internet.

Several factors have been found to impair traffic flow to and from constrained devices in practical deployments. These factors are frequently related to the use of UDP as the transport protocol for CoAP. According to Edeline, K., Kuehlewind, M., Trammell, B., Aben, E., and B. Donnet, "Using UDP for Internet Transport Evolution", Proceedings arXiv preprint 1612.07816, 2016", complete blocking of UDP occurs in between 2% and 4% of terrestrial access networks, with such blocking typically occurring in restricted access networks or networks in regions that experience other challenges in connectivity. In addition to this total blocking of UDP in certain access networks, traffic with UDP headers may also be subject to particularly short NAT binding lifetimes. A NAT binding lifetime refers to the length of time for which a binding between specific local and wider network addresses will be maintained. In most terrestrial access networks, the mean binding lifetime for UDP connections is between 2 and 3 minutes; a situation which can present significant problems for the management of devices on such connections.

LWM2M uses continuous keep-alive messages to address the issue of short NAT binding lifetimes for UDP connections. These messages, exchanged between the constrained device and its managing LWM2M server, reset the timer for the NAT binding on the connection, so keeping the NAT binding open. This procedure, while overcoming the short NAT binding lifetimes for UDP connections, increases message traffic and represents an undesirable drain on constrained device battery. In addition, keep-alive messages will have no effect in situations in which UDP traffic is simply blocked by the gateway.

SUMMARY

It is an aim of the present disclosure to provide a method, apparatus and computer readable medium which at least partially address one or more of the challenges discussed above.

According to a first aspect of the present disclosure, there is provided a method for operating a constrained device within a network, the network comprising a Network Address Translation (NAT) node deployed between the constrained device and a manager. The method, performed by the constrained device, comprises receiving from the manager configuration information for a Port Control Protocol (PCP) configuration data Object on the constrained device, the configuration information comprising a value for a Resource in the PCP configuration data Object, and execution of a Resource in the PCP configuration data Object, the execution triggering sending of a PCP request. The method further comprises sending a PCP Request to the NAT node in accordance with the executed Resource, the PCP Request including the Resource value received in the configuration information.

According to examples of the present disclosure, the NAT node may comprise the default gateway for the constrained device. The manager may be running a LWM2M server and the PCP configuration data Object on the constrained device may be stored within a LWM2M client running on the constrained device.

For the purposes of the present disclosure, a constrained device comprises a device which conforms to the definition set out in section 2.1 of IETF RFC 7228 for "constrained node". According to the definition in IETF RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitors and other sensors for personal health (continuous monitoring of blood pressure etc.) actuators and connected electronic door locks.

According to examples of the present disclosure, the PCP Request may include the PCP configuration data Object.

According to examples of the present disclosure, the method may further comprise checking for a response from the NAT node to the PCP request, and, on failure to receive a response within a timeout interval, sending the PCP Request to an Anycast address.

According to examples of the present disclosure, the method may further comprise receiving a PCP Response to the PCP Request, checking a result code of the PCP Response, and if the result code indicates success, updating a value of a PCP Status Resource in the PCP configuration data Object.

According to examples of the present disclosure, the updated value may indicate successful enablement of PCP on a NAT node serving the constrained device. The NAT node may be the default gateway or another NAT node serving the constrained device (for example following sending of the PCP request to the Anycast address).

According to examples of the present disclosure, the method may further comprise receiving from the manager a subscription request for a value of a PCP status Resource in the PCP configuration data Object, and responding to the subscription request with a notification to the manager of the current value of the PCP status Resource.

According to examples of the present disclosure, the method may further comprise, on updating a value of the PCP Status Resource in the PCP configuration data Object, sending a notification to the manager including the updated value of the PCP Status Resource.

According to examples of the present disclosure, receiving configuration information for a PCP configuration data Object on the constrained device may comprise receiving a value for a NAT Binding Lifetime Resource in the PCP data configuration object, the value for the NAT Binding Lifetime Resource specifying a desired lifetime for a NAT binding on a connection involving the constrained device.

According to examples of the present disclosure, values for other Resources may be received in the configuration information in addition to or instead of the value of the Lifetime Resource, such values including for example a value for a PCP Version resource.

According to examples of the present disclosure, the method may further comprise sending a registration request to the manager, the registration request including a binding mode.

According to examples of the present disclosure, the method may further comprise sending a bootstrap request to a bootstrapping server, and receiving from the bootstrapping server configuration information creating on the constrained device the PCP configuration data Object and initialising Resources in the PCP configuration data Object to default values.

According to another aspect of the present disclosure, there is provided a method for managing a constrained device within a network, the network comprising a NAT node deployed between the constrained device and a manager. The method, performed by the manager, comprises configuring a PCP configuration data Object on the constrained device by replacing a value for a Resource in the PCP configuration data Object and executing a Resource in the PCP configuration data Object, the execution triggering the constrained device to send a PCP request to the NAT node.

According to examples of the present disclosure, the PCP configuration data Object on the constrained device may be stored within a LWM2M client running on the constrained device. According to examples of the present disclosure, the method be performed by a manager, which may be running a LWM2M server.

According to examples of the present disclosure, triggering the constrained device to send a PCP request to the NAT node may comprise triggering the constrained device to send a PCP Request including the PCP configuration data Object.

According to examples of the present disclosure, the method may further comprise monitoring for successful enablement of PCP on a NAT node serving the constrained device.

According to examples of the present disclosure, the NAT node serving the constrained device may be the default gateway for the constrained device or may be a different gateway, for example if the default gateway does not support PCP.

According to examples of the present disclosure, monitoring for successful enablement of PCP on a NAT node serving the constrained device may comprise subscribing to a value of a PCP status Resource in the PCP configuration data Object on the constrained device.

According to examples of the present disclosure, the method may further comprise receiving a notification from the constrained device that PCP has been successfully enabled on a NAT node serving the constrained device.

According to examples of the present disclosure, the notification may be a subscription notification of a change in the value of the PCP Status Resource.

According to examples of the present disclosure, the method may further comprise receiving from the constrained device a registration request, checking a binding mode of the registration request, and proceeding with or abandoning configuration of the PCP configuration data Object on the constrained device according to the value of the binding mode.

According to examples of the present disclosure, the method may comprise proceeding with configuration of the PCP configuration data Object if the binding mode in the registration request indicates a UDP connection, and in particular if the binding mode is "UDP connection in queue mode", and abandoning configuration of the PCP configuration data Object if the binding mode is anything else.

According to examples of the present disclosure, replacing a value for a Resource in the PCP configuration data Object may comprise replacing a value for a NAT Binding Lifetime Resource in the PCP data configuration object, the value for the NAT Binding Lifetime Resource specifying a desired lifetime for a NAT binding on a connection involving the constrained device.

According to examples of the present disclosure, triggering the constrained device to send a PCP request to the NAT node may comprise triggering the constrained device to request a binding in the NAT node having a lifetime corresponding to the value of the NAT Binding Lifetime Resource in the PCP data configuration object.

According to examples of the present disclosure, values for other Resources may be replaced during configuration of the data Object, in addition to or instead of the value of the Lifetime Resource, such values including for example a value for a PCP Version resource.

According to another aspect of the present disclosure, there is provided a method for configuring a constrained device within a network, the network comprising a NAT node deployed between the constrained device and a manager. The method, performed by a bootstrapping server, comprises receiving from the constrained device a bootstrap request, creating on the constrained device a PCP configuration data Object comprising a plurality of Resources, and initialising the Resources to default values.

According to examples of the present disclosure, the method may be performed by a LWM2M Bootstrap Server and the PCP configuration data Object may be created within a LWM2M client running on the constrained device.

According to examples of the present disclosure, the PCP configuration data Object may comprise an Execute PCP Request Resource operable to trigger the sending of a PCP Request by the constrained device.

According to examples of the present disclosure, the PCP configuration data Object may comprise a PCP Status Resource operable to indicate successful enablement of PCP on a NAT node serving the constrained device.

According to examples of the present disclosure, the PCP configuration data Object may comprise a NAT Binding Lifetime Resource, a value of which specifies a desired lifetime for a NAT binding on a connection involving the constrained device.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a constrained device, the constrained device being operable for deployment within a network comprising a NAT node deployed between the constrained device and a manager. The constrained device comprises a processor and a memory, the memory containing instructions executable by the processor such that the constrained device is operable to receive from the manager configuration information for a PCP configuration data Object on the constrained device. The configuration information comprises a value for a Resource in the PCP configuration data Object and execution of a Resource in the PCP configuration data Object, the execution triggering sending of a PCP request. The constrained device is also operable to send a PCP Request to the NAT node in accordance with the executed Resource, the PCP request including the Resource value received in the configuration information.

According to another aspect of the present disclosure, there is provided a constrained device, the constrained device being operable for deployment within a network comprising a NAT node deployed between the constrained device and a manager. The constrained device is adapted to receive from the manager configuration information for a PCP configuration data Object on the constrained device, the configuration information comprising a value for a Resource in the PCP configuration data Object and execution of a Resource in the PCP configuration data Object, the execution triggering sending of a PCP request. The constrained device is also adapted to send a PCP Request to the NAT node in accordance with the executed Resource, the PCP request including the Resource value received in the configuration information.

According to another aspect of the present disclosure, there is provided a constrained device, the constrained device being operable for deployment within a network comprising a NAT node deployed between the constrained device and a manager. The constrained device comprises a receiving module for receiving from the manager configuration information for a PCP configuration data Object on the constrained device, the configuration information comprising a value for a Resource in the PCP configuration data Object and execution of a Resource in the PCP configuration data Object, the execution triggering sending of a PCP request. The constrained device also comprises a transmission module for sending a PCP Request to the NAT node in accordance with the executed Resource, the PCP request including the Resource value received in the configuration information.

According to another aspect of the present disclosure, there is provided a manager for managing a constrained device within a network, the network comprising a NAT node deployed between the constrained device and the manager. The manager comprises a processor and a memory, the memory containing instructions executable by the processor such that the constrained device is operable to configure a PCP configuration data Object on the constrained device by replacing a value for a Resource in the PCP configuration data Object and executing a Resource in the PCP configuration data Object, the execution triggering the constrained device to send a PCP request to the NAT node.

According to another aspect of the present disclosure, there is provided a manager for managing a constrained device within a network, the network comprising a NAT node deployed between the constrained device and the manager. The manager is adapted to configure a PCP configuration data Object on the constrained device by replacing a value for a Resource in the PCP configuration data Object and executing a Resource in the PCP configuration data Object, the execution triggering the constrained device to send a PCP request to the NAT node.

According to another aspect of the present disclosure, there is provided a manager for managing a constrained device within a network, the network comprising a NAT node deployed between the constrained device and the manager. The manager comprises a constrained device configuration module for configuring a PCP configuration data Object on the constrained device by replacing a value for a Resource in the PCP configuration data Object, and executing a Resource in the PCP configuration data Object, the execution triggering the constrained device to send a PCP request to the NAT node.

According to another aspect of the present disclosure, there is provided a bootstrapping server for configuring a constrained device within a network, the network comprising a NAT node deployed between the constrained device and a manager. The bootstrapping server comprises a processor and a memory, the memory containing instructions executable by the processor such that the bootstrapping server is operable to receive from the constrained device a bootstrap request, create on the constrained device a PCP configuration data Object comprising a plurality of Resources, and initialise the Resources to default values.

According to another aspect of the present disclosure, there is provided a bootstrapping server for configuring a constrained device within a network, the network comprising a NAT node deployed between the constrained device and a manager. The bootstrapping server is adapted to receive from the constrained device a bootstrap request, create on the constrained device a Port Control Protocol, PCP, configuration data Object comprising a plurality of Resources, and initialise the Resources to default values.

According to another aspect of the present disclosure, there is provided a bootstrapping server for configuring a constrained device within a network, the network comprising a NAT node deployed between the constrained device and a manager. The bootstrapping server comprises a receiving module for receiving from the constrained device a bootstrap request, and a device configuration module for creating on the constrained device a PCP configuration data Object comprising a plurality of Resources, and for initialising the Resources to default values.

BRIEF DESCRIPTION OF THE DRAWINGS

For a better understanding of the present disclosure, and to show more clearly how it may be carried into effect, reference will now be made, by way of example, to the following drawings in which:

FIG. 4 is a diagram illustrating an example data object;

DETAILED DESCRIPTION

Aspects of the present disclosure provide methods according to which a manager of a constrained device may cause the constrained device to configure a NAT node deployed between the manager and the constrained device. The constrained device may configure the NAT node such that a lifetime of a NAT binding for the connection between the manager and the constrained device is set to a value chosen by the manager. Aspects of the present disclosure make use of the Port Control Protocol (PCP), defined in IETF RFC 6887 and IETF RFC 7723. PCP allows for the creation of explicit mappings between an external IP address, protocol and port and an internal IP address, protocol and port. PCP requires a PCP client and a PCP server, and uses a communication pattern of request-response using UDP as the transport protocol.

Figure 1:
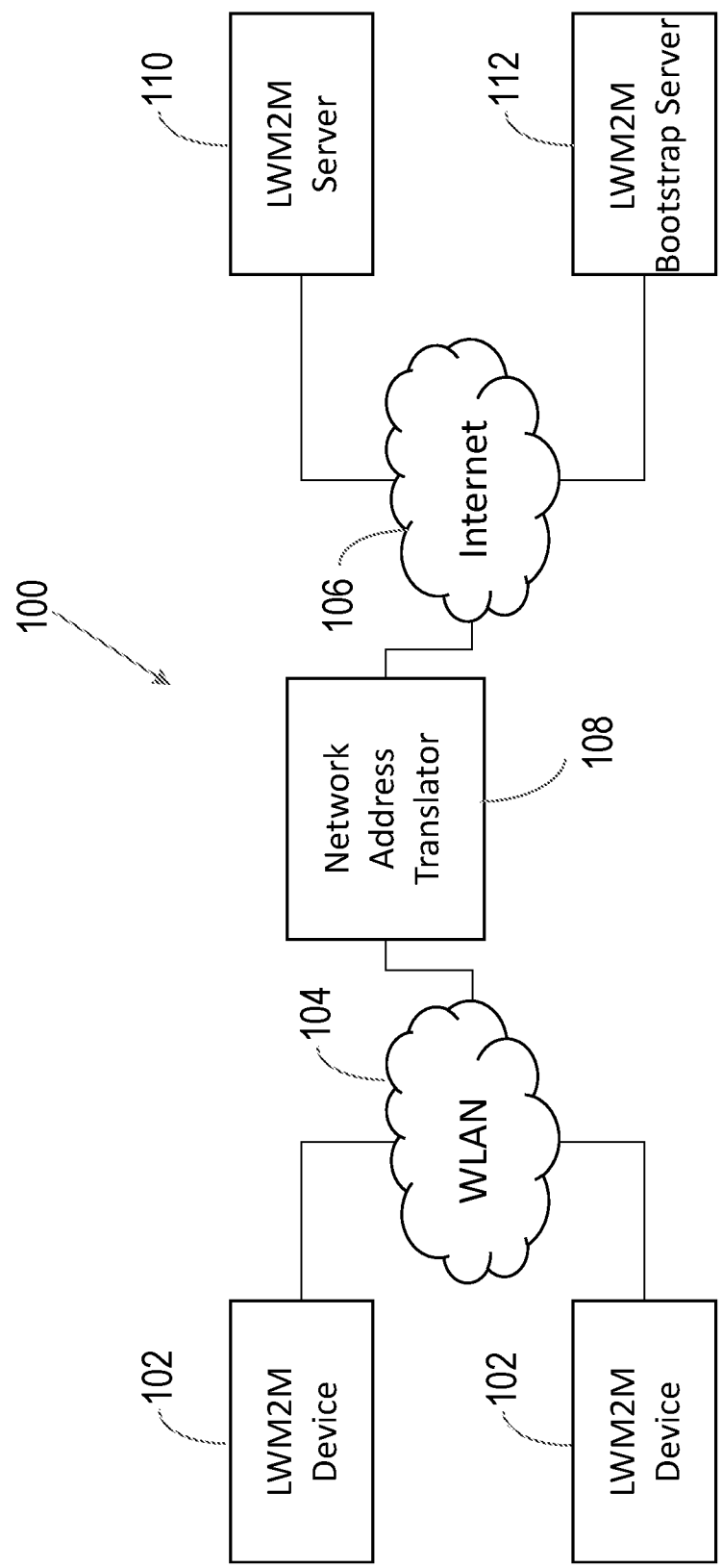
FIG. 1 is a block diagram illustrating a network topology.

FIG. 1 is a block diagram illustrating a network topology 100 within which aspects of the present disclosure may be implemented. Referring to FIG. 1, in the example network topology 100, at least one constrained device 102 is deployed on a local network, which may be a wireless LAN (WLAN) 104. The WLAN 104 is connected to the wider Internet 106 by a gateway which performs Network Address Translation. This gateway is illustrated as Network Address Translator, or NAT node 108. The constrained device or devices 102 are managed using LWM2M, and are therefore illustrated as LWM2M devices. The network topology 100 further comprises a LWM2M server 110 and a LWM2M Bootstrap server 112. The LWM2M server 110 and LWM2M Bootstrap server are connected to the Internet 106, and communicate with the LWM2M device or devices 102 via the NAT node 108. Typical LWM2M deployments include a range of LWM2M devices on the same subnet under some form of Home Gateway (for home devices) or under some other private network infrastructure which contains routers which act as NAT nodes. The network topology of FIG. 1 is thus a generalised representation of a LWM2M deployment.

The NAT node 108 may be running a PCP server, and may thus be a PCP controlled device. In some examples of the present disclosure, it may be assumed that no other PCP clients are available to the NAT. The constrained device may be running a PCP client. It will be appreciated that the PCP client logic for the constrained device is minimal, as the underlying stack is essentially the same as a CoAP based device stack, meaning the constrained device may act as a PCP client while remaining lightweight.

Figure 2:
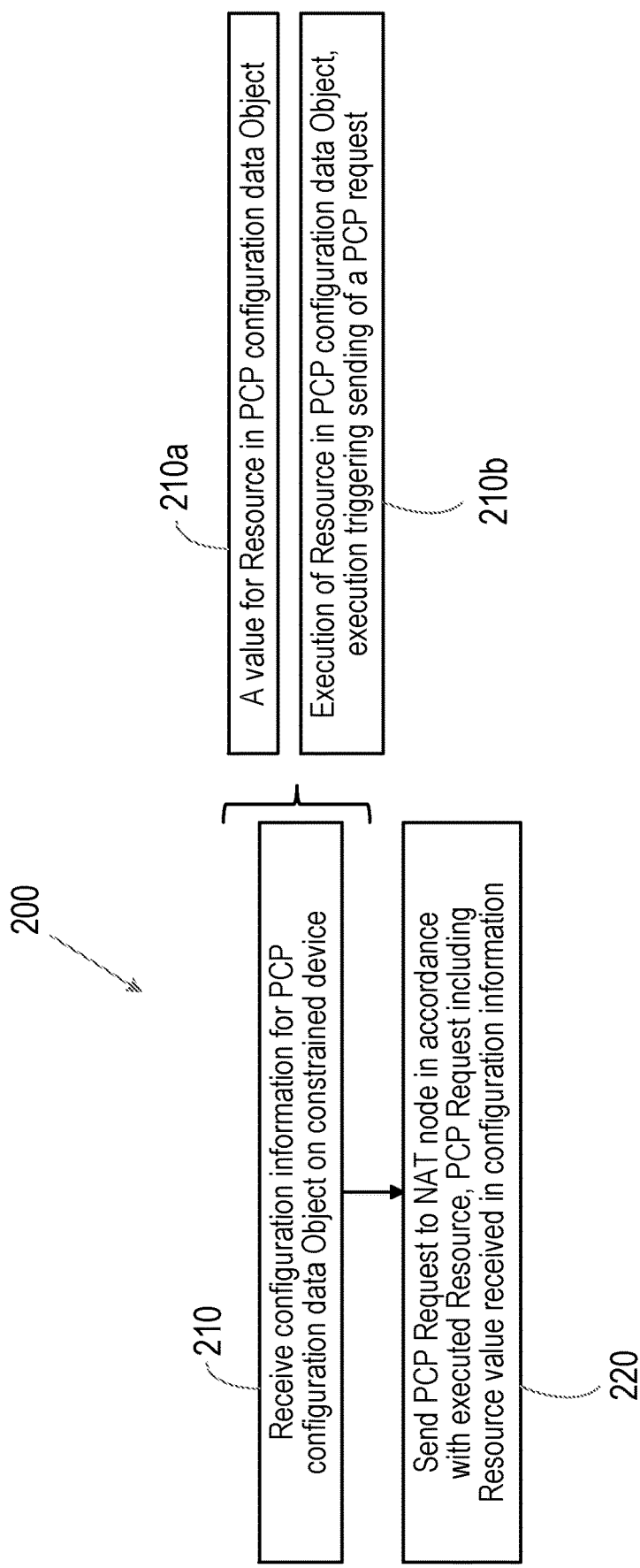
FIG. 2 is a flow chart illustrating process steps in a method for operating a constrained device.

FIG. 2 is a flow chart illustrating process steps in a method 200 for operating a constrained device within a network in accordance with aspects of the present disclosure. The constrained device conducting the method may be a constrained device 102 as illustrated in FIG. 1, and the network may comprise a NAT node 108 deployed between the constrained device and a manager 110 of the constrained device, also as illustrated in FIG. 1. The constrained device may be configured to communicate using a RESTful protocol including for example CoAP, MQTT, HTTP etc.

Referring to FIG. 2, the method 200 comprises, in a first step 210, receiving from the manager of the constrained device configuration information for a PCP configuration data object on the constrained device. The PCP configuration data object may for example be an IPSO object. The IPSO object model is an example of a data model which may be used to represent constrained device capabilities and information in the format Object/instance/resource. The PCP configuration data object is discussed in further detail below with reference to FIG. 4. The configuration information received by the constrained device in step 210 comprises a value for a Resource in the PCP configuration data object as illustrated at 210a, and execution of a Resource in the PCP configuration data object as illustrated at 210b, the execution triggering sending by the constrained device of a PCP request. The method further comprises, at step 220, sending a PCP Request to the NAT node deployed between the constrained device and the manager in accordance with the executed Resource, the PCP Request including the Resource value received in the configuration information.

Figure 3A:
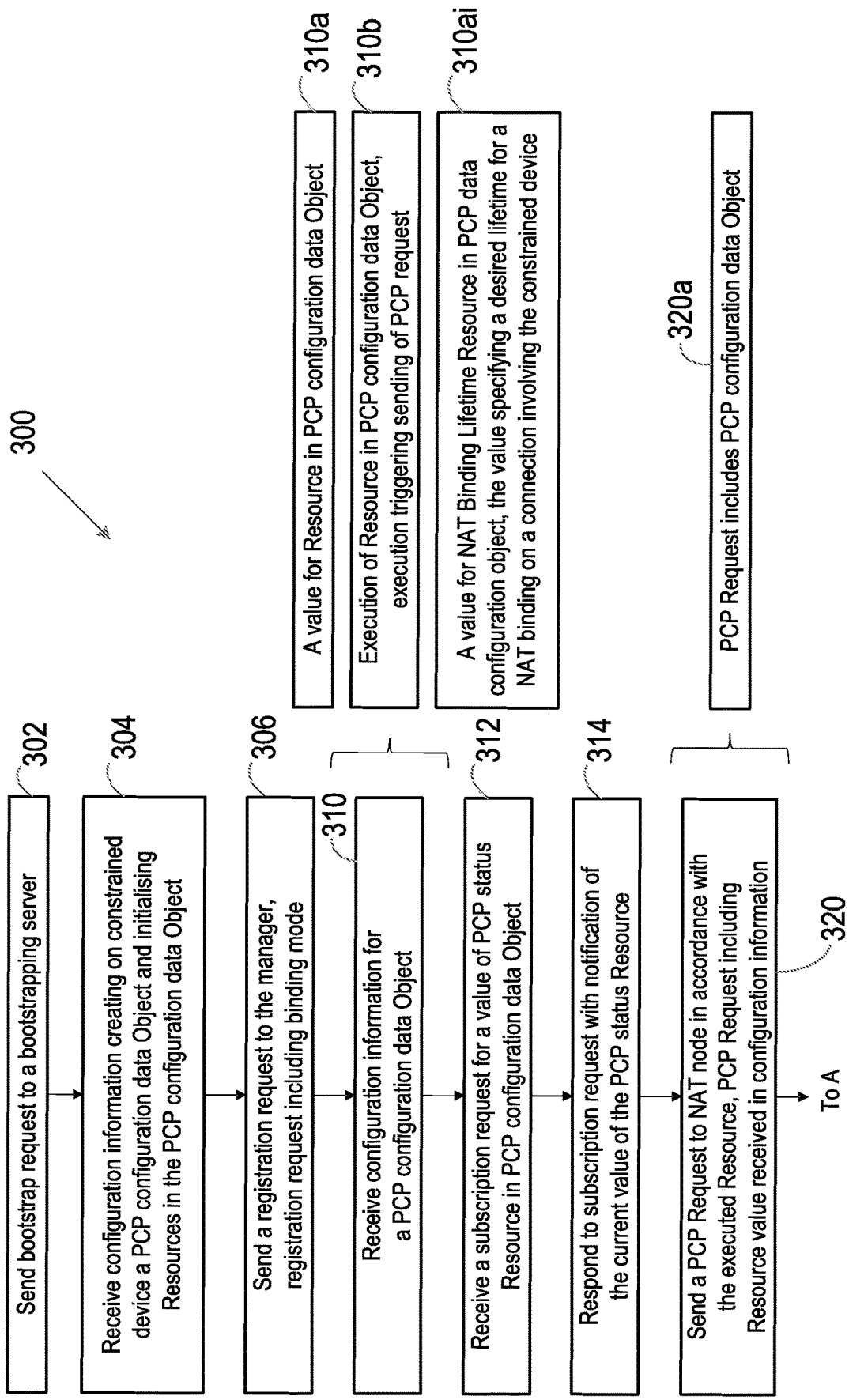
FIGS. 3a and 3b are flow charts illustrating process steps in another example of method for operating a constrained device.
Figure 3B:
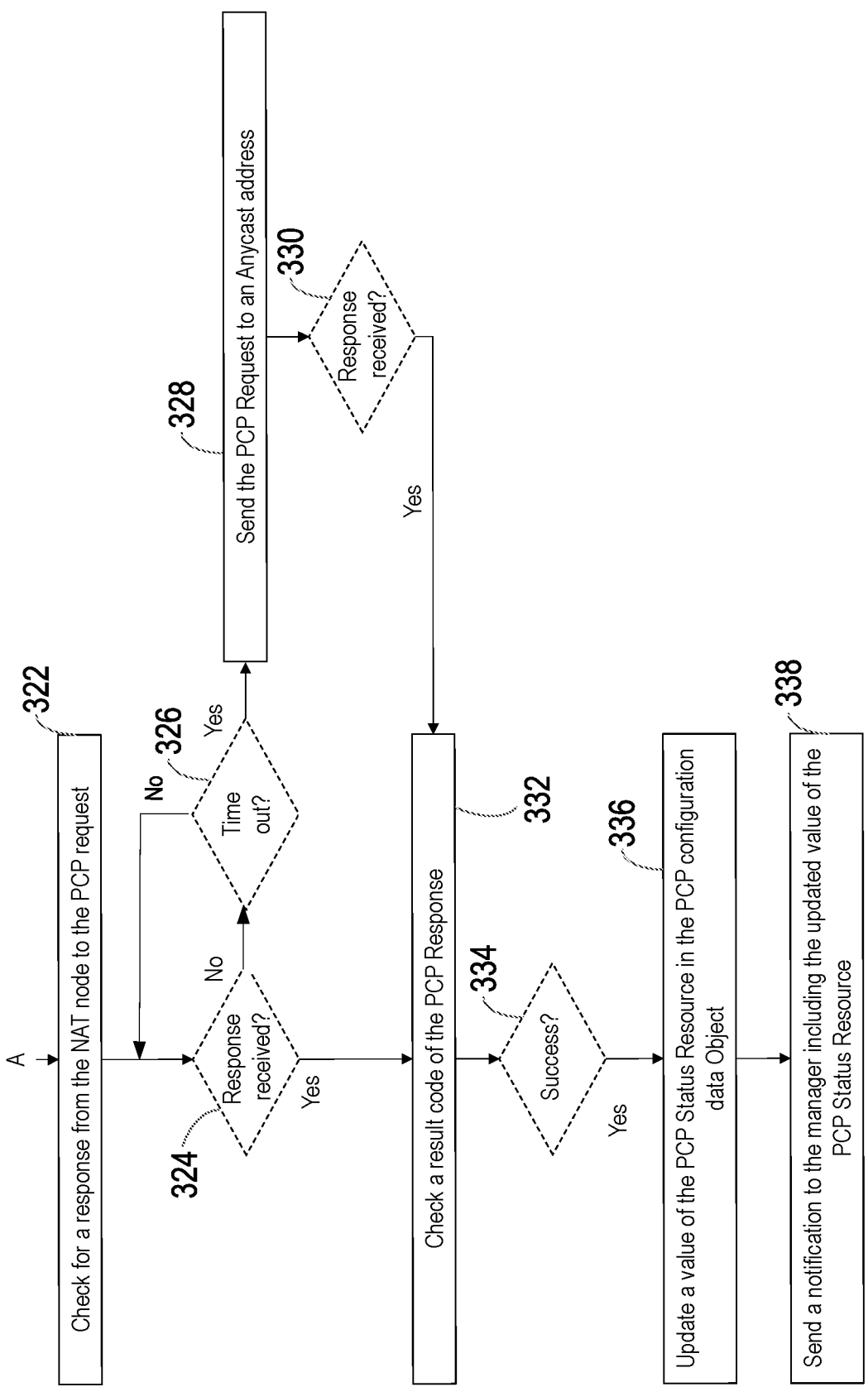

FIGS. 3a and 3b illustrate process steps in another example of a method 300 for operating a constrained device within a network in accordance with aspects of the present disclosure. The steps of the method 300 illustrate one way in which the steps of the method 200 may be subdivided and supplemented in order to achieve the above discussed and additional functionality. As for the method of FIG. 2 above, the constrained device conducting the method 300 may be a constrained device 102 as illustrated in FIG. 1, and the network may comprise a NAT node 108 deployed between the constrained device and a manager 110 of the constrained device, also as illustrated in FIG. 1. The constrained device may be configured to communicate using a RESTful protocol including for example CoAP, MQTT, HTTP etc.

Referring to FIG. 3a, in a first step 302, the method 300 comprises sending by the constrained device of a bootstrap request to a bootstrapping server. The bootstrap request may be sent via the NAT node 108 and, being initiated by the constrained device, may cause the NAT node to establish a NAT binding to the bootstrapping server. In step 304, the method comprises receiving from the bootstrapping server configuration information creating on the constrained device a PCP configuration data object, and initialising Resources in the PCP configuration data object to default values. The PCP configuration data Object may for example be created within a LWM2M client running on the constrained device.

An example of a PCP configuration data object 400 is illustrated in FIG. 4. Information in the example PCP configuration data object is contained in the LWM2M/IPSO format comprising a plurality of Resources, each Resource having a value. Referring to FIG. 4, the example PCP Configuration data object 400 comprises five Resources 402. The first resource (Resource ID 0) is a PCP Version Resource 404. This is an Integer type resource the value of which indicates a supported version of PCP. The default value for the PCP Version Resource 804 is 2. The second resource (Resource ID 1) is a Lifetime Resource 406. This is also an Integer type resource the value of which indicates a duration, for example in seconds, of a NAT binding lifetime. The third resource (Resource ID 2) is an IP Address Resource 408. This is a Long type resource providing an IP address of the constrained device. The IP address may for example be a global IPv6 address. The fourth resource (Resource ID 3) is a PCP Status Resource 410. This is a Boolean type resource, a value of which may indicate whether or not PCP has been successfully enabled. If PCP has been successfully enabled, the value of this resource may be 1. The fifth resource (Resource ID 4) is an Execute PCP Request Resource 412. This is an Executable type resource which may be used by the manager to trigger sending of a PCP request by the constrained device. Other examples of PCP configuration data object may include different or additional Resources to those illustrated.

Referring again to FIG. 3a, after initialisation of Resources on the PCP configuration data object to default values in step 304, the method 300 comprises, in step 306, sending a registration request to the manager of the constrained device, the registration request including a binding mode. In some examples of the method 300, the binding mode may be "UDP connection in queue mode", for example if the constrained device is using CoAP over UDP, as will often be the case. The method then comprises, in step 310, receiving from the manager configuration information for the PCP configuration data object on the constrained device. The configuration information may update one or more of the values of the Resources in the PCP configuration data object from the default values set by the bootstrapping server. As illustrated at 310a and 310b, the configuration information comprises a value for a Resource in the PCP configuration data object and execution of a Resource in the PCP configuration data object, the execution triggering sending of a PCP request. As illustrated at 310ai, the configuration information may include a value for a NAT Binding Lifetime Resource in the PCP data configuration object. The NAT Binding Lifetime Resource may correspond to the Lifetime resource 406 of the example PCP Configuration data object 400, and the value for this resource may specify a desired lifetime for a NAT binding on a connection involving the constrained device.

The method 300 then comprises, at step 312, receiving from the manager a subscription request for a value of a PCP Status Resource in the PCP configuration data object and, at step 314, responding to the subscription request with a notification to the manager of the current value of the PCP Status Resource.

In step 320, the method 300 comprises sending a PCP Request to the NAT node deployed between the constrained device and the manager in accordance with the executed Resource, the PCP Request including the Resource value received in the configuration information. Thus in examples in which a value for the NAT Binding Lifetime resource is received, this value may be included in the PCP request sent to the NAT node. As illustrated at 320a, the PCP request may include the PCP configuration data Object.

Referring now to FIG. 3b, after sending the PCP request to the NAT node, the method 300 comprises checking for a response from the NAT node to the PCP request at step 322. If no response has been received (No at step 324), the method comprises checking for expiry of a timeout interval. If the timeout interval has not yet expired (No at step 326), the method returns to step 324 until either a response is received or the timeout interval expires. If the timeout interval has expired with no response received (Yes at step 326), the method comprises sending the PCP request that was previously sent to the NAT node to an Anycast address in step 328, and checking for a response in step 330. The timeout interval may expire without receipt of a response to the PCP request from the NAT node for example if the NAT node does not support PCP.

On receipt of a response to the PCP request (Yes at step 324 or step 330), the method 300 comprises checking a result code of the PCP response. The response may be received from the NAT node or from a different node, if the PCP request was sent to an Anycast address in accordance with step 328. If the result code of the PCP response indicates success (yes at step 334), then this indicates that PCP has been successfully enabled on the responding node. In the case of a PCP request including a value of a NAT Binding Lifetime Resource, this indicates that the lifetime of the NAT binding for the connection involving the constrained device has been updated with the lifetime specified in the value of the NAT Binding Lifetime Resource. If the result code indicates success, the method comprises updating a value of a PCP Status Resource in the PCP configuration data object at step 336. The method further comprises sending a notification to the manager including the updated value of the PCP Status Resource. This notification may sent as an ongoing response to the subscription request received from the manager at step 312.

The method 300 illustrates, from the point of view of a constrained device, how an example of the present disclosure may enable the configuring of a NAT node such that a NAT binding involving the constrained device may have its lifetime set according to configuration information received by the constrained device from a constrained device manager, thus overruling a default NAT binding lifetime that would be selected by the NAT node.

The method 300, conducted in a constrained device, may be complimented by methods 500, 600 and/or 700 conducted in a bootstrapping server and a manager, as discussed below with reference to FIGS. 5 to 7.

Figure 5:
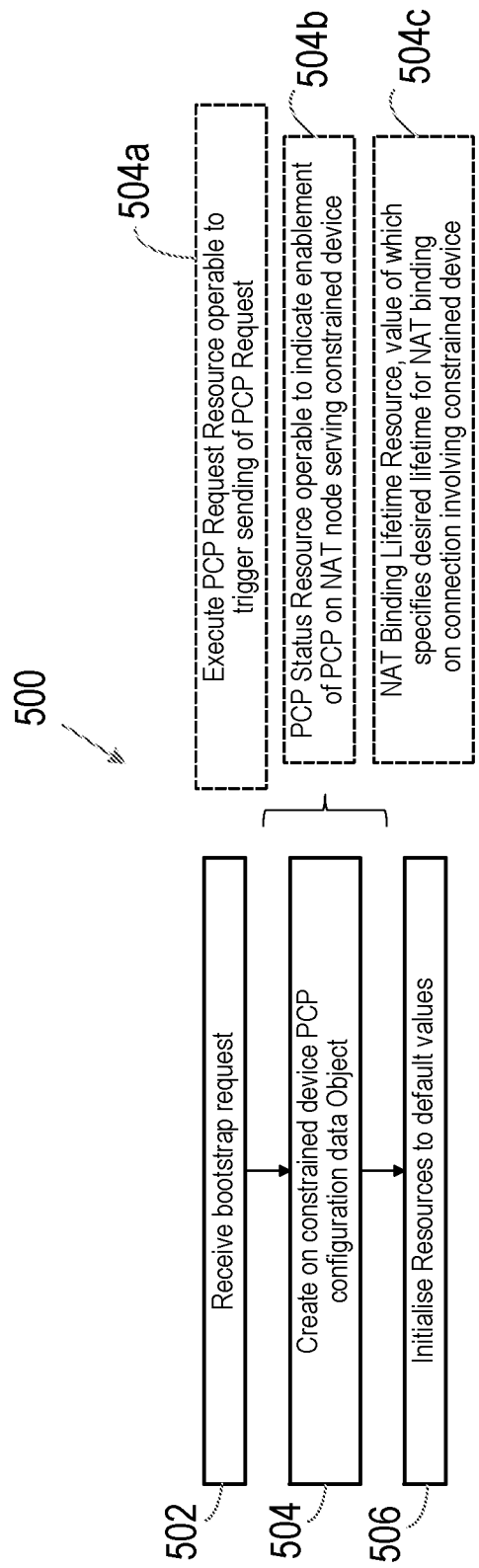
FIG. 5 is a flow chart illustrating process steps in a method for configuring a constrained device.

FIG. 5 is a flow chart illustrating process steps in a method 500 for configuring a constrained device within a network in accordance with aspects of the present disclosure. The method may be conducted by a bootstrapping server, such as the LWM2M bootstrapping server 112 of FIG. 1. The constrained device configured according to the method may be a constrained device 102 as illustrated in FIG. 1, and the network may comprise a NAT node 108 deployed between the constrained device and the LWM2M bootstrapping server and a manager of the constrained device, also as illustrated in FIG. 1. The constrained device may be configured to communicate using a RESTful protocol including for example CoAP, MQTT, HTTP etc.

Referring to FIG. 5, the method 500 comprises, in a first step 502, receiving from the constrained device a bootstrap request. The method then comprises, in step 504, creating on the constrained device a PCP configuration data object comprising a plurality of Resources. In step 506, the method 500 comprises initialising the Resources in the PCP configuration data object to default values.

The PCP configuration data Object may be created within a LWM2M client running on the constrained device, and may in some examples resemble the example PCP configuration data object 400 of FIG. 4. As illustrated at 504a of FIG. 5, the PCP configuration data object may comprise an Execute PCP Request Resource operable to trigger the sending of a PCP Request by the constrained device. As illustrated at 504b of FIG. 5, the PCP configuration data object may comprise a PCP Status Resource operable to indicate successful enablement of PCP on a NAT node serving the constrained device. As illustrated at 504c of FIG. 5, the PCP configuration data object may comprise a NAT Binding Lifetime Resource, a value of which specifies a desired lifetime for a NAT binding on a connection involving the constrained device.

Figure 6:
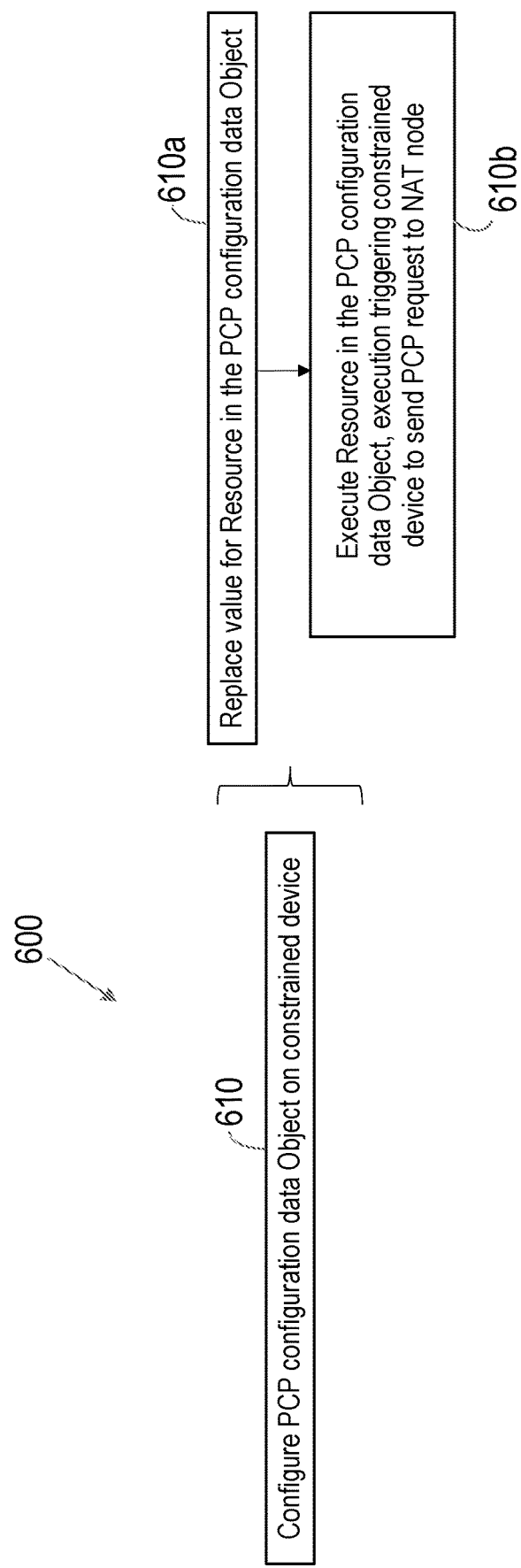
FIG. 6 is a flow chart illustrating process steps in a method for managing a constrained device.

FIG. 6 is a flow chart illustrating process steps in a method 600 for managing a constrained device within a network in accordance with aspects of the present disclosure. The method may be conducted by a manager, which may be running a LWM2M server such as the LWM2M server 110 of FIG. 1. The constrained device managed according to the method may be a constrained device 102 as illustrated in FIG. 1, and the network may comprise a NAT node 108 deployed between the constrained device and the manager of the constrained device, also as illustrated in FIG. 1. The constrained device may be configured to communicate using a RESTful protocol including for example CoAP, MQTT, HTTP etc.

Referring to FIG. 6, the method 600 comprises, in a first step 610, configuring a PCP configuration data object on the constrained device. As discussed above with reference to FIG. 5, the PCP configuration data object on the constrained device may have been created and default Resource values initialised by a bootstrapping server. The PCP configuration data object may be stored within a LWM2M client running on the constrained device. The manager configures the PCP configuration data object on the constrained device at step 510 by, in step 510a, replacing a value for a Resource in the PCP configuration data object, and, in step 510b, executing a Resource in the PCP configuration data object, the execution triggering the constrained device to send a PCP request to the NAT node deployed between the constrained device and the manager.

Figure 7:
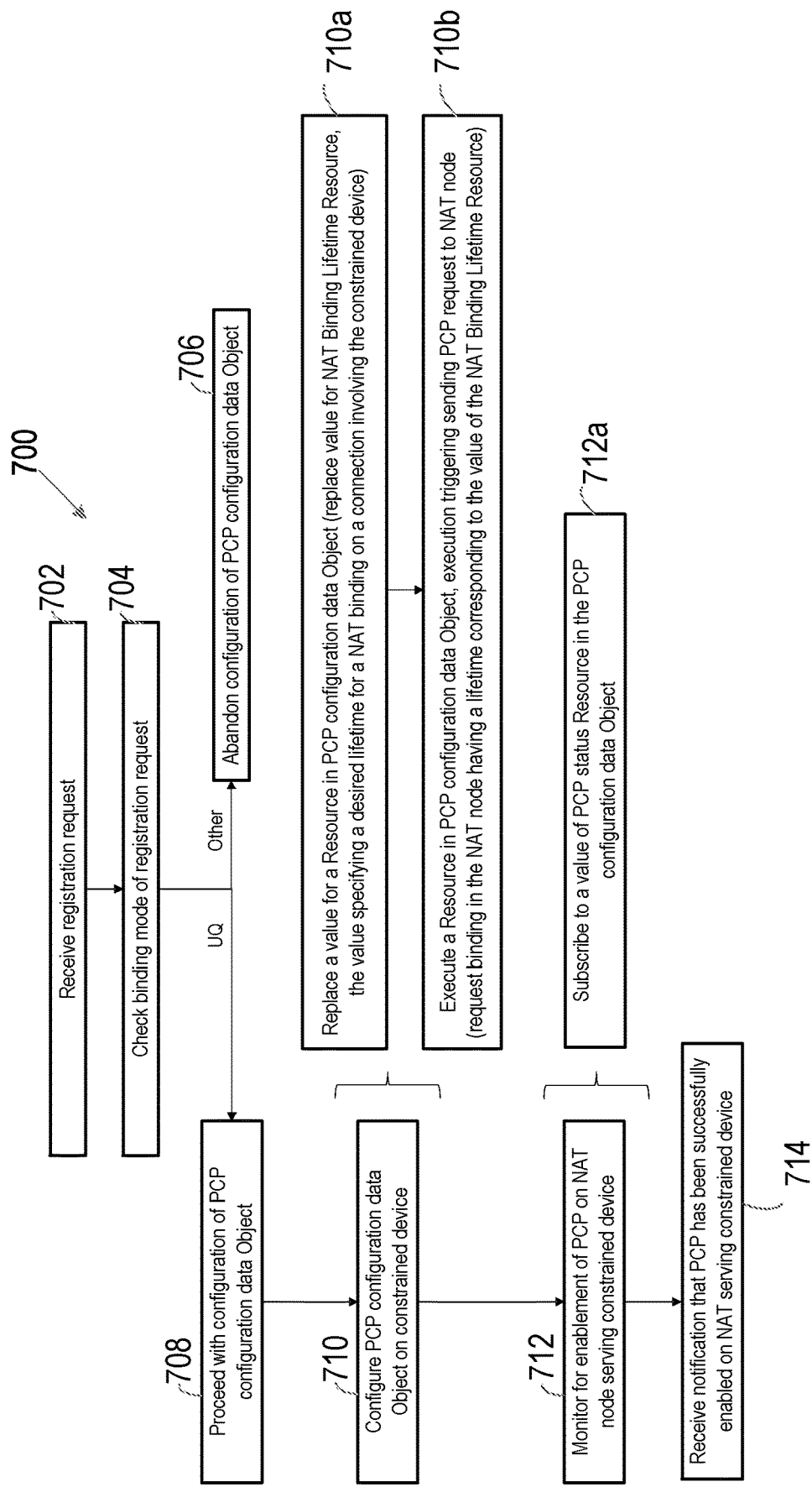
FIG. 7 is a flow chart illustrating process steps in another example of method for managing a constrained device.

FIG. 7 illustrates process steps in another example of a method 700 for managing a constrained device within a network in accordance with aspects of the present disclosure. The steps of the method 700 illustrate one way in which the steps of the method 600 may be subdivided and supplemented in order to achieve the above discussed and additional functionality. As for the method of FIG. 6 above, the method may be conducted by a manager, which may be running a LWM2M server such as the LWM2M server 110 of FIG. 1. The constrained device managed according to the method may be a constrained device 102 as illustrated in FIG. 1, and the network may comprise a NAT node 108 deployed between the constrained device and the manager of the constrained device, also as illustrated in FIG. 1.

Referring to FIG. 7, in a first step 702, the method 700 comprises receiving from the constrained device a registration request. The method 700 further comprises checking a binding mode of the registration request in step 704 and proceeding with or abandoning configuration of a PCP configuration data object on the constrained device according to the value of the binding mode. As illustrated in FIG. 7, the method may comprise proceeding with configuration of the PCP configuration data object in step 708 if the binding mode in the registration request indicates a UDP connection, and in particular if the binding mode is "UDP connection in queue mode" (illustrated as UQ in FIG. 7), and abandoning configuration of the PCP configuration data Object in step 706 if the binding mode is anything else.

If the manager proceeds with configuration of the PCP configuration data object in step 708, the method 700 comprises configuring the PCP configuration data object on the constrained device in step 710. This comprises replacing a value for a Resource in the PCP configuration data object in step 710a and executing a Resource in the PCP configuration data object in step 710b, the execution triggering the constrained device to send a PCP request to the NAT node deployed between the constrained device and the manager. As illustrated in FIG. 7, replacing a value for a Resource in the PCP configuration data object may comprise replacing a value for a NAT Binding Lifetime Resource in the PCP data configuration object, the value for the NAT Binding Lifetime Resource specifying a desired lifetime for a NAT binding on a connection involving the constrained device. Also as illustrate in FIG. 7, triggering the constrained device to send a PCP request to the NAT node may comprise triggering the constrained device to request a binding in the NAT node having a lifetime corresponding to the value of the NAT Binding Lifetime Resource in the PCP data configuration object.

According to examples of the method 700, values for other Resources may be replaced during configuration of the PCP configuration data object, in addition to or instead of the value of the Lifetime Resource, such values including for example a value for a PCP Version resource. Also according to examples of the method 700, triggering the constrained device to send a PCP request to the NAT node may comprise triggering the constrained device to send a PCP Request including the PCP configuration data object.

The method 700 further comprises monitoring for successful enablement of PCP on a NAT node serving the constrained device. The NAT node serving the constrained device may be the default gateway for the constrained device or may be a different gateway, for example if the default gateway does not support PCP. As illustrated in step 712a, monitoring for successful enablement of PCP on a NAT node serving the constrained device may comprise subscribing to a value of a PCP Status Resource in the PCP configuration data object on the constrained device.

In step 714, the method 700 comprises receiving a notification from the constrained device that PCP has been successfully enabled on a NAT node serving the constrained device. The notification may for example be a subscription notification of a change in the value of the PCP Status Resource.

Examples of the methods 200, 300, 500, 600 and/or 700 may cooperate to enable a manager of a constrained device to cause the constrained device to configure a serving NAT gateway such that a binding lifetime for a NAT binding is set as selected by the manager. In this manner, a default very short NAT binding lifetime may be lengthened, so avoiding the need for extensive keep-alive messages to be exchanged between the constrained device and the manager. The methods discussed above take advantage of the configuration possibilities of PCP without requiring significant additional complexity in the constrained device. As discussed above, the PCP client logic for the constrained device is minimal, as the underlying stack is essentially the same as a CoAP based device stack, meaning the constrained device may act as a PCP client while remaining lightweight. The logic for selecting a NAT binding lifetime, or any other parameter to be configured in the NAT node, is located in the manager, which may be running a LWM2M server, with the constrained device being initially bootstrapped with an appropriate data object and then executing a PCP request as triggered by the manager.

Figure 8:
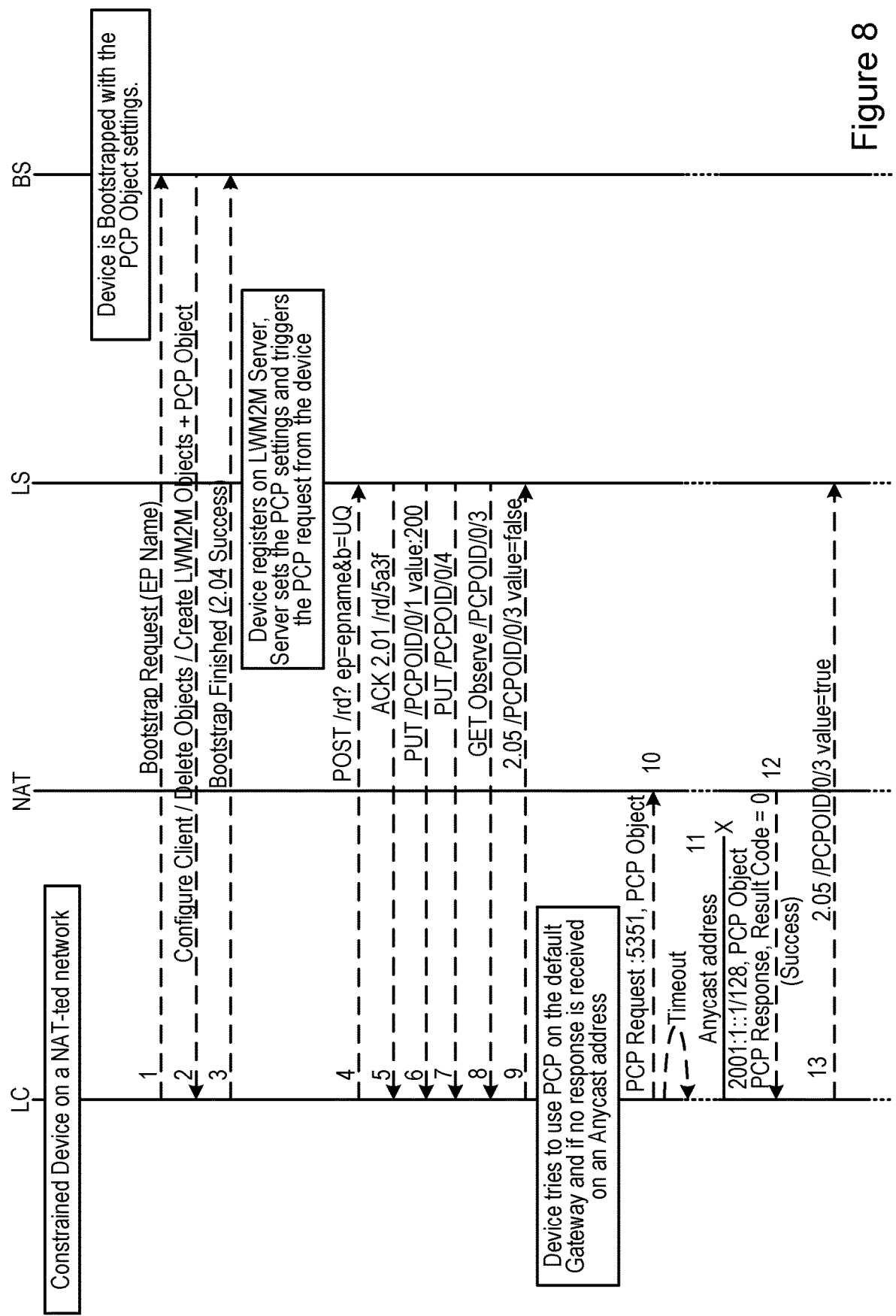
FIG. 8 is a message flow diagram.

FIG. 8 is a message flow diagram illustrating an example implementation of the methods discussed above. The message flow of FIG. 8 illustrates one way in which examples of the above discussed methods may be integrated with existing bootstrapping and registration procedures according to the LWM2M management protocol.

In the message flow diagram of FIG. 8, the element LC represents a constrained device, on which is running a LWM2M client, a CoAP server and a PCP client. The element NAT represents a NAT node hosting a PCP server. The element LS represents a manager on which is running a LWM2M server and a CoAP client. The element BS represents a LWM2M bootstrapping server. The message flow of FIG. 8 refers to a PCP configuration data object (PCP object) having the format of the example PCP configuration object 400 illustrated in FIG. 4. References in messages of FIG. 8 to specific resources are to the resource identifiers as illustrated in the example object of FIG. 4.

Referring to FIG. 8, the first three messages of the message flow illustrate a process in which the constrained device is bootstrapped with the PCP configuration object settings. In message 1, the LWM2M Client on the constrained device requests Bootstrap to the LWM2M Bootstrap Server. In message 2, the LWM2M Bootstrap Server overwrites information on the constrained device, deleting existing data objects and creating LWM2M objects for management of the constrained device and, according to the methods discussed above, a PCP configuration data object, referred to as "PCP Object" in FIG. 8. In message 3, the LWM2M Client on the constrained device confirms the bootstrapping process to be complete.

Messages 4 to 9 of FIG. 8 illustrate a process in which the constrained device registers on the LWM2M server and the LWM2M server, hosted on the manager, configures the PCP object on the constrained device, setting values for resources on the PCP object and triggering the sending of a PCP request by the constrained device. In message 4, the LWM2M Client on the constrained device requests registration with the LWM2M server, providing its end point name and indicating a binding mode. If the binding mode is "UQ", for "UDP connection in queue mode", the LWM2M Server can enable PCP. The LWM2M server initially acknowledges the registration request in message 5 and then sets a value for the lifetime resource on the PCP object (200 seconds in the example of FIG. 8) as well as for example setting the appropriate PCP version on the LWM2M client. In message 6, the LWM2M server triggers the sending of a PCP request by the client by executing the appropriate resource on the PCP object. In message 8, the LWM2M server subscribes to a value of the PCP Status resource on the PCP object, and in message 9, the LWM2M client on the constrained device responds to the subscription request with an initial notification of "false", indicating that PCP has not yet been successfully enabled. Messages 6 to 9 in FIG. 8 identify individual resources on the PCP object using the format {Object ID}/{Instance ID}/{Resource ID}. Thus, and with additional reference to the example PCP object of FIG. 4, message 6 of FIG. 8: PUT /PCPOID/0/1 value=200 has the effect of writing the value 200 into Resource ID 1 of the PCP object. Resource 1 can be seen from FIG. 4 to be the NAT Lifetime Resource.

Similarly, message 7 of FIG. 8: PUT/PCPOID/0/4 has the effect of executing resource 4 of the PCP object, which can be seen from FIG. 4 to be the resource for executing a PCP request.

Messages 10 to 15 of FIG. 8 illustrate a process in which the constrained device tries to use PCP on its default gateway and, if no response is received, tries to use PCP on an Anycast address. In message 10, the LWM2M client sends first a PCP request to the default gateway (the gateway that provided a DHCP6 resolution) on port 5351. The PCP request contains the PCP object, including the Lifetime Resource. If no response is received from the default gateway it may be assumed that the default gateway does not support PCP. The LWM2M Client then tries the default Anycast address 2001:1::1/128 in message 11, and awaits a response. The PCP protocol includes a forwarding procedure, according to which the PCP request sent to the Anycast address will be forwarded until it reaches a node supporting PCP. In message 12, the LWM2M client receives a PCP response and the LWM2M client can check the result code of the response. According to established PCP operation, a result code of 0 indicates success, meaning the value of the PCP Status resource in the PCP object may be updated to reflect successful enabling of PCP. In accordance with the subscription request received from the LWM2M server in message 8, the LWM2M client sends a notification of the updated PCP Status resource value to the LWM2M server in message 13.

It will be appreciated that the PCP response received in message 12 may be received from the default gateway or from another gateway, if the PCP request was forwarded to the Anycast address. If the PCP response was received from a gateway other than the default gateway, subsequent traffic to/from the constrained device may be routed through that gateway to take advantage of the successfully enabled PCP on that gateway.

At this point the device may continue communicating with the LWM2M server normally or may go to sleep, and the configured NAT should keep the binding on the connection between the constrained device and the LWM2M server open for the newly configured lifetime. If the IP address used in the PCP object is a global IPv6 address, the NAT should maintain that mapping towards interfaces outside the local scope.

Figure 9:
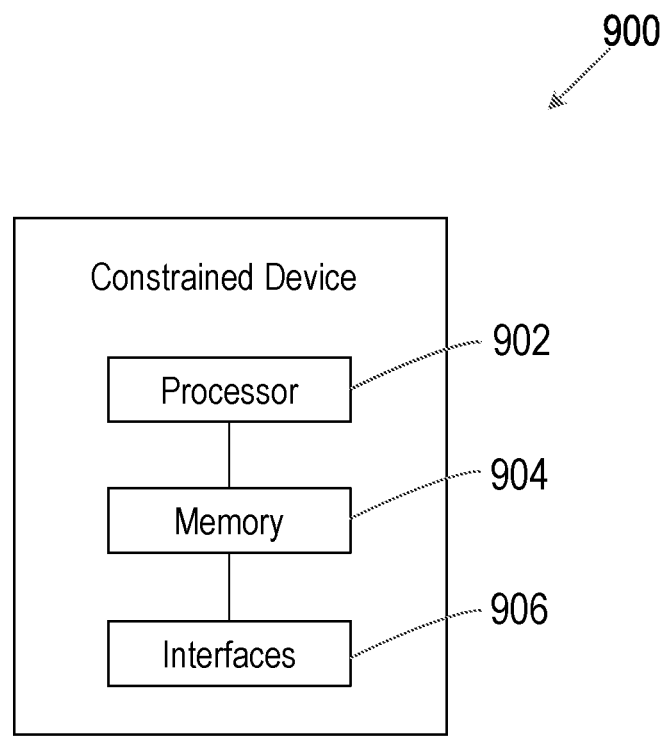
FIG. 9 is a block diagram illustrating functional units in a constrained device.

As discussed above, the methods 200, 300 may be performed by a constrained device. FIG. 9 is a block diagram illustrating an example constrained device 900 which may implement the methods 200, 300 according to examples of the present disclosure, for example on receipt of suitable instructions from a computer program. Referring to FIG. 9, the constrained device 900 comprises a processor 902, a memory 904 and interfaces 906. The memory 904 contains instructions executable by the processor 902 such that the constrained device 900 is operative to conduct some or all of the steps of the method 200 and/or 300.

Figure 10:
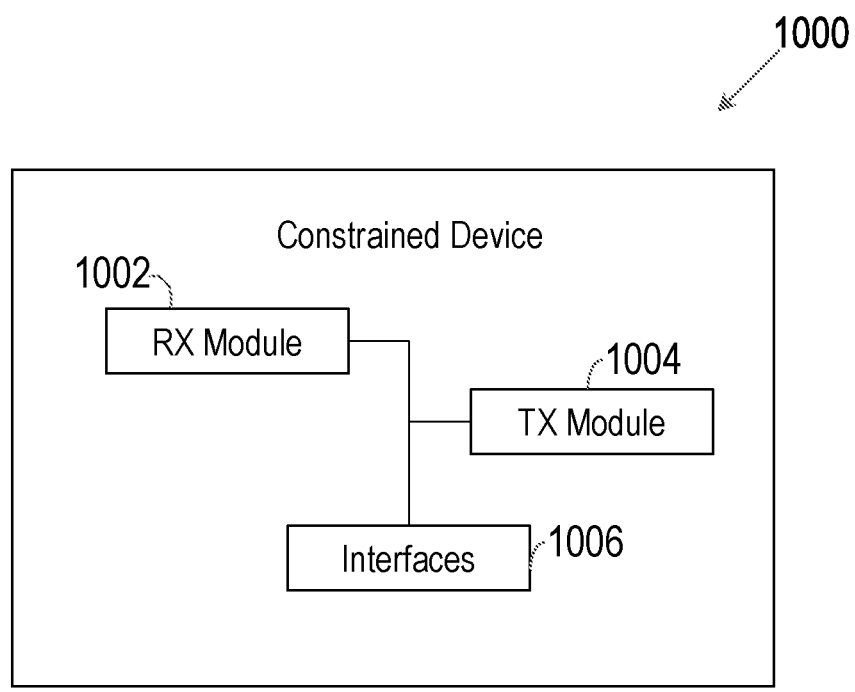
FIG. 10 is a block diagram illustrating functional units in another example of constrained device.

FIG. 10 illustrates functional units in another example of constrained device 1000 which may execute examples of the methods 200, 300 of the present disclosure, for example according to computer readable instructions received from a computer program. It will be understood that the units illustrated in FIG. 10 are functional units, and may be realised in any appropriate combination of hardware and/or software. The units may comprise one or more processors and may be integrated to any degree.

Referring to FIG. 10, the constrained device 1000 comprises a receiving module 1002 for receiving from a manager configuration information for a PCP configuration data object on the constrained device, the configuration information comprising a value for a Resource in the PCP configuration data object and execution of a Resource in the PCP configuration data object, the execution triggering sending of a PCP request. The constrained device 1000 also comprises a transmission module 1004 for sending a PCP Request to a NAT node in accordance with the executed Resource, the PCP request including the Resource value received in the configuration information. The constrained device also comprises interfaces 1006.

Also as discussed above, the method 500 may be performed by a bootstrapping server. The bootstrapping server may be a single element or may be part of a distributed function, which may for example be a Virtualized Network Function.

Figure 11:
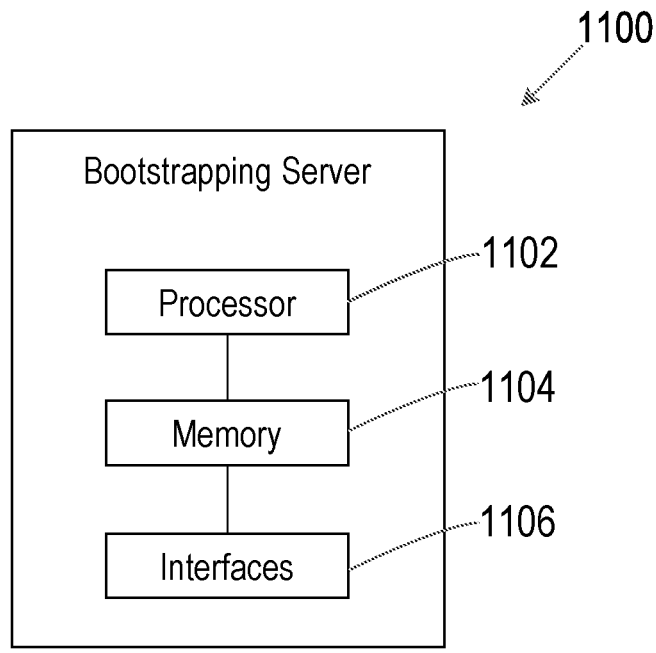
FIG. 11 is a block diagram illustrating functional units in a bootstrapping server.

FIG. 11 is a block diagram illustrating an example bootstrapping server 1100 which may implement the method 500 according to examples of the present disclosure, for example on receipt of suitable instructions from a computer program. Referring to FIG. 11, the bootstrapping server 1100 comprises a processor 1102, a memory 1104 and interfaces 1106. The memory 1104 contains instructions executable by the processor 1102 such that the bootstrapping server 1100 is operative to conduct some or all of the steps of the method 500.

Figure 12:
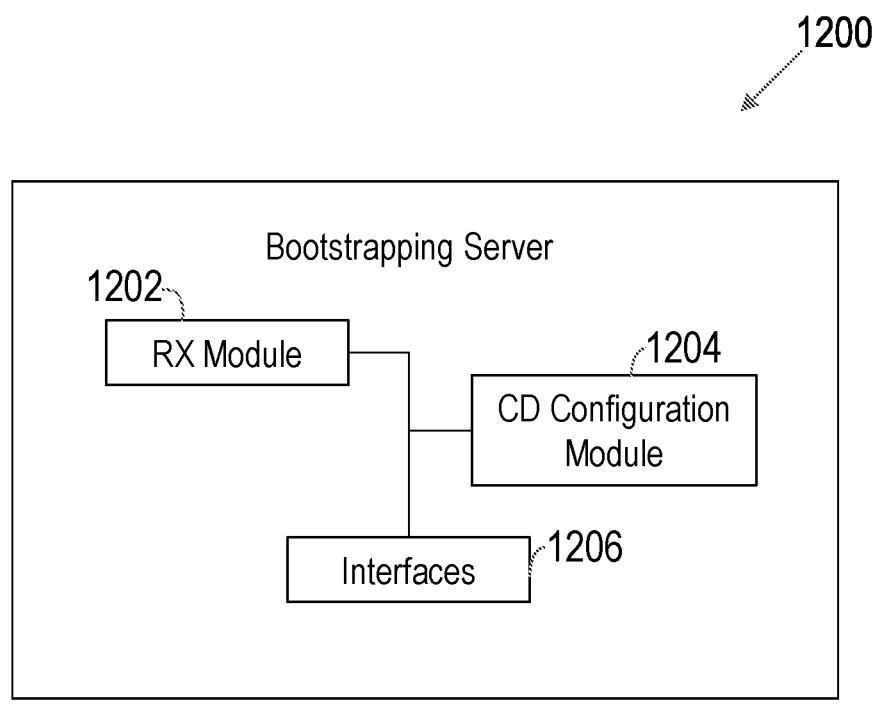
FIG. 12 is a block diagram illustrating functional units in another example of bootstrapping server.

FIG. 12 illustrates functional units in another example of bootstrapping server 1200 which may execute examples of the method 500 of the present disclosure, for example according to computer readable instructions received from a computer program. It will be understood that the units illustrated in FIG. 12 are functional units, and may be realised in any appropriate combination of hardware and/or software. The units may comprise one or more processors and may be integrated to any degree.

Referring to FIG. 12, the bootstrapping server 1200 comprises a receiving module 1202 for receiving from a constrained device a bootstrap request. The bootstrapping server further comprises a device configuration module 1204 for creating on the constrained device a PCP configuration data object comprising a plurality of Resources, and for initialising the Resources to default values. The bootstrapping server further comprises interfaces 1206.

Also as discussed above, the methods 600, 700 may be performed by a constrained device manager. The manager may be a single element or may be part of a distributed management function, which may for example be a Virtualized Network Function.

Figure 13:
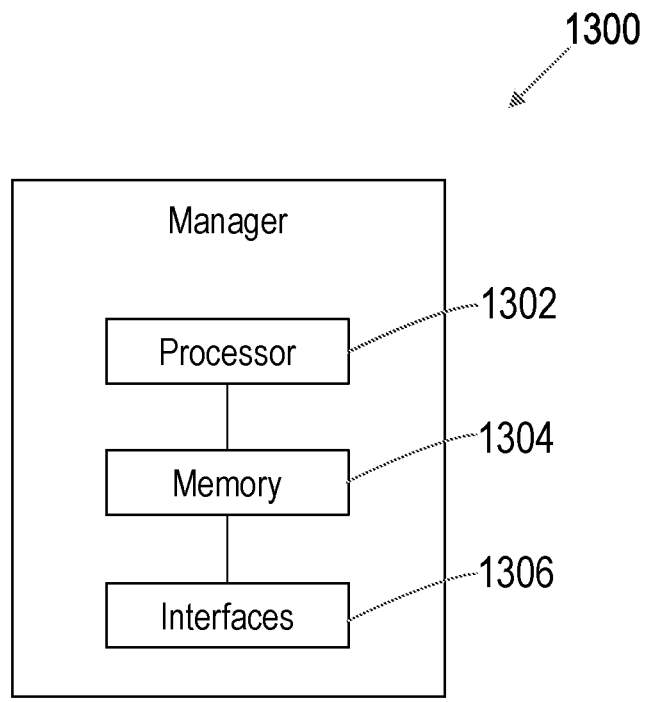
FIG. 13 is a block diagram illustrating functional units in a manager.

FIG. 13 is a block diagram illustrating an example manager 1300 which may implement the methods 600, 700 according to examples of the present disclosure, for example on receipt of suitable instructions from a computer program. Referring to FIG. 13, the manager 1300 comprises a processor 1302, a memory 1304 and interfaces 1306. The memory 1304 contains instructions executable by the processor 1302 such that the manager 1300 is operative to conduct some or all of the steps of the method 600 and/or 700.

Figure 14:
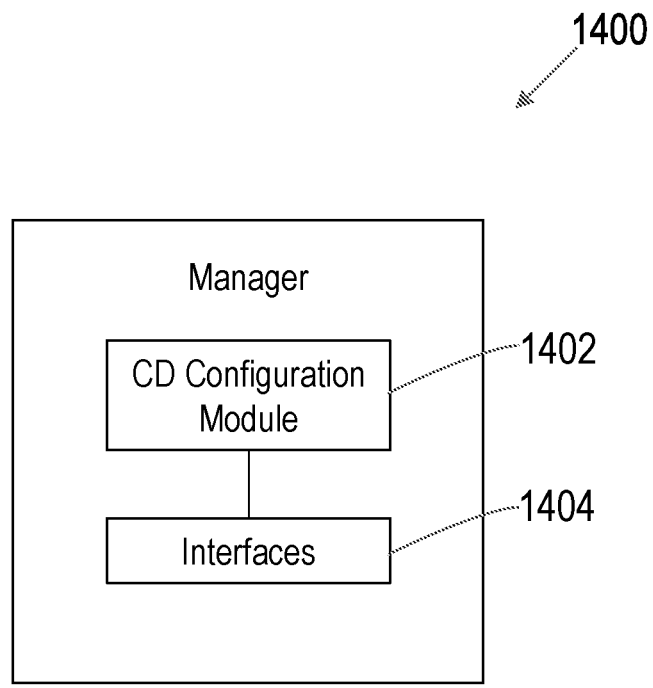
FIG. 14 is a block diagram illustrating functional units in another example of manager.

FIG. 14 illustrates functional units in another example of manager 1400 which may execute examples of the methods 600, 700 of the present disclosure, for example according to computer readable instructions received from a computer program. It will be understood that the units illustrated in FIG. 14 are functional units, and may be realised in any appropriate combination of hardware and/or software. The units may comprise one or more processors and may be integrated to any degree.

Referring to FIG. 14, the manager 1400 comprises a constrained device configuration module 1402 for configuring a PCP configuration data object on a constrained device and interfaces 1404. The constrained device configuration module 1402 is for configuring a PCP configuration data object on a constrained device by replacing a value for a Resource in the PCP configuration data object and executing a Resource in the PCP configuration data object, the execution triggering the constrained device to send a PCP request to the NAT node.

Aspects of the present disclosure provide methods according to which a NAT node may be configured by a constrained device. The NAT node may be configured to provide a longer lasting NAT binding lifetime for a connection involving a constrained device than would usually be the case. In this manner, continuous signalling in the form of keep-alive messages to keep NAT bindings open may be avoided. Avoiding the need for keep-alive messages reduces power consumption in the constrained device, so improving battery life. In addition, scaling of IoT deployments on the management side is made easier without the need for continuous per-device signalling.

Examples of the methods of the present disclosure may be integrated into the LWM2M bootstrapping and registration procedures. Configuring and monitoring of PCP settings for the NAT node configuration may be performed by a constrained device manager, placing minimal extra demands on the constrained device, which receives configuration information and acts accordingly.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A constrained device, the constrained device being operable for deployment within a network comprising a Network Address Translation (NAT) node deployed between the constrained device and a manager, the constrained device comprising:
   processing circuitry;
   memory containing instructions executable by the processing circuitry whereby the constrained device is operative to:
      receive, from the manager, configuration information for a Port Control Protocol (PCP) configuration data Object on the constrained device, the configuration information comprising:
         a value for a Resource in the PCP configuration data Object; and
         execution of a Resource in the PCP configuration data Object, the execution triggering sending of a PCP request; and
      send a PCP Request to the NAT node in accordance with the executed Resource, the PCP request including the value for the Resource received in the configuration information.

2. The device of claim 1, wherein the PCP Request includes the PCP configuration data Object.

3. The device of claim 1, wherein the instructions are such that the constrained device is operative to:
   check for a response from the NAT node to the PCP request; and
   send, in response to a failure to receive a response within a timeout interval, the PCP Request to an Anycast address.

4. The device of claim 1, wherein the instructions are such that the constrained device is operative to:
   receive a PCP Response to the PCP Request;
   check a result code of the PCP Response; and
   update, if the result code indicates success, a value of a PCP Status Resource in the PCP configuration data Object.

5. The device of claim 1, wherein the instructions are such that the constrained device is operative to:
   receive, from the manager, a subscription request for a value of a PCP status Resource in the PCP configuration data Object;
   respond to the subscription request with a notification, to the manager, of the current value of the PCP status Resource; and
   send, upon updating a value of the PCP Status Resource in the PCP configuration data Object, a notification to the manager including the updated value of the PCP Status Resource.

6. The device of claim 1, wherein the instructions are such that the constrained device is operative to receive configuration information for a PCP configuration data Object on the constrained device by receiving a value for a NAT Binding Lifetime Resource in the PCP configuration data Object, the value for the NAT Binding Lifetime Resource specifying a desired lifetime for a NAT binding on a connection involving the constrained device.

7. The device of claim 1, wherein the instructions are such that the constrained device is operative to send a registration request to the manager, the registration request including a binding mode.

8. The device of claim 1, wherein the instructions are such that the constrained device is operative to:
   send a bootstrap request to a bootstrapping server; and
   receive, from the bootstrapping server, configuration information creating, on the constrained device, the PCP configuration data Object and initializing Resources in the PCP configuration data Object to default values.

9. A manager for managing a constrained device within a network; the network comprising a Network Address Translation (NAT) node deployed between the constrained device and the manager; the manager comprising
   processing circuitry;
   memory containing instructions executable by the processing circuitry whereby the manager is operative to configure a Port Control Protocol, PCP, configuration data Object on the constrained device by:
      replacing a value for a Resource in the PCP configuration data Object; and
      executing a Resource in the PCP configuration data Object, the execution triggering the constrained device to send a PCP request to the NAT node.

10. The manager of claim 9, wherein triggering the constrained device to send a PCP request to the NAT node comprises triggering the constrained device to send a PCP Request including the PCP configuration data Object.

11. The manager of claim 9, wherein the instructions are such that the manager is operative to monitor for successful enablement of PCP on a NAT node serving the constrained device.

12. The manager of claim 11, wherein monitoring for successful enablement of PCP on a NAT node serving the constrained device comprises subscribing to a value of a PCP status Resource in the PCP configuration data Object on the constrained device.

13. The manager of claim 11, wherein the instructions are such that the manager is operative to receive a notification from the constrained device that PCP has been successfully enabled on a NAT node serving the constrained device.

14. The manager of claim 9, wherein the instructions are such that the manager is operative to:
   receive a registration request from the constrained device;
   check a binding mode of the registration request; and
   proceed with or abandon configuration of the PCP configuration data Object on the constrained device according to the value of the binding mode.

15. The manager of claim 9, wherein replacing a value for a Resource in the PCP configuration data Object comprises:
   replacing a value for a NAT Binding Lifetime Resource in the PCP configuration data Object, the value for the NAT Binding Lifetime Resource specifying a desired lifetime for a NAT binding on a connection involving the constrained device; and
   wherein triggering the constrained device to send a PCP request to the NAT node comprises triggering the constrained device to request a binding in the NAT node having a lifetime corresponding to the value of the NAT Binding Lifetime Resource in the PCP configuration data Object.

16. A method for configuring a constrained device within a network; the network comprising a Network Address Translation (NAT) node deployed between the constrained device and a manager; the method comprising a bootstrapping server:

receiving a bootstrap request from the constrained device;

creating, on the constrained device, a Port Control Protocol (PCP) configuration data Object comprising a plurality of Resources; and initializing the Resources to default values.

17. The method of claim 16, wherein the PCP configuration data Object comprises an Execute PCP Request Resource operable to trigger the sending of a PCP Request by the constrained device.

18. The method of claim 16, wherein the PCP configuration data Object comprises a PCP Status Resource operable to indicate successful enablement of PCP on a NAT node serving the constrained device.

19. The method of claim 16, wherein the PCP configuration data Object comprises a NAT Binding Lifetime Resource, a value of the NAT Binding Lifetime Resource specifying a desired lifetime for a NAT binding on a connection involving the constrained device.

20. A bootstrapping server for configuring a constrained device within a network; the network comprising a Network Address Translation (NAT) node deployed between the constrained device and a manager; the bootstrapping server comprising:

processing circuitry;

memory containing instructions executable by the processing circuitry whereby the bootstrapping server is operative to:

receive a bootstrap request from the constrained device;

create, on the constrained device, a Port Control Protocol (PCP) configuration data Object comprising a plurality of Resources; and initialize the Resources to default values.

* * * * *